(12) United States Patent
Seitz et al.

(10) Patent No.: US 7,550,705 B2
(45) Date of Patent: Jun. 23, 2009

(54) HIGHLY SENSITIVE SOLID-STATE IMAGE SENSOR

(75) Inventors: Peter Seitz, Urdorf (CH); Felix Lustenberger, Cham (CH)

(73) Assignee: CSEM Centre Suisse d'Electronique et de Microtechnique SA, Neuchatel (CH)

( * ) Notice: Subject to any disclaimer, the term of this patent is extended or adjusted under 35 U.S.C. 154(b) by 17 days.

(21) Appl. No.: 11/663,412

(22) PCT Filed: Sep. 26, 2005

(86) PCT No.: PCT/CH2005/000554

§ 371 (c)(1),
(2), (4) Date: Mar. 21, 2007

(87) PCT Pub. No.: WO2006/034599

PCT Pub. Date: Apr. 6, 2006

(65) Prior Publication Data

US 2007/0267578 A1 Nov. 22, 2007

(30) Foreign Application Priority Data

Sep. 29, 2004 (EP) .................................. 04405611

(51) Int. Cl.
*H01L 27/00* (2006.01)
*G01J 1/00* (2006.01)
(52) U.S. Cl. .................................. 250/208.1; 250/395
(58) Field of Classification Search ............... 250/208.1, 250/395; 257/292, 443
See application file for complete search history.

(56) References Cited

U.S. PATENT DOCUMENTS

| 4,808,822 | A | 2/1989 | Manning et al. |
| 5,841,126 | A | 11/1998 | Fossum et al. |
| 2001/0030699 | A1 | 10/2001 | Sakuragi |
| 2003/0042400 | A1 | 3/2003 | Hynecek |
| 2006/0139251 | A1* | 6/2006 | Morosawa et al. ............ 345/76 |

FOREIGN PATENT DOCUMENTS

EP 1 624 490 2/2006

(Continued)

OTHER PUBLICATIONS

A. J. P. Theuwissen: "Solid State Imaging with Charge Coupled Devices", Kluwer Academic Publishers, Dordrecht, 1995 : only the relevent parts concerning "how to process photo-charge signals with the so-called correlated double sampling (CDS) technique to eliminate virtually two noise sources".

(Continued)

*Primary Examiner*—David P Porta
*Assistant Examiner*—Faye Boosalis
(74) *Attorney, Agent, or Firm*—Weingarten, Schurgin, Gagnebin & Lebovici LLP (57) ABSTRACT

A solid-state image sensor (1) with very high sensitivity approaching the single-photon limit is realized with three modular building blocks: (a) a pixel (2.11, 2.12, . . . ) with a photo-site, intermediate photo-charge storage capability as used for correlated double sampling, and an electronic circuit for signal buffering or amplification, (b) a column or row signal line (3.1) to which a plurality of such pixels (2.11, 2.21, . . . ) is connected using transistor switches, incorporating a low-pass filter (30.1), and (c) a readout circuit (4) to which the row signal lines (3.1, 3.2, . . . ) are connected, consisting of a plurality of analog amplifiers (41.1, 41.2, . . . ) with an analog multiplexer (42). Photo-generated signals are read out and the reset level is subtracted either in the analog or in the digital domain, to implement a correlated-double-sampling method.

18 Claims, 4 Drawing Sheets

FOREIGN PATENT DOCUMENTS

FR        2 762 741       10/1998
WO     WO 99/66709      12/1999

OTHER PUBLICATIONS

P. Seitz, "Solid-state Image Sensing", in "Handbook of Computer Vision and Applications", eds. B. Jahne, H. Haussecker and P. Geissler, pp. 165-122, Academic Press, New York, 1999.

J. Janesick et al. "Sub-electron noise charge coupled devices", Proc. SPIE, vol. 1242, pp. 238-251, 1990.

A. Krymski et al. describe in "A 2e- Noise 1.3 Megapixel CMOS Sensor", Proc. 2003 IEEE Workshop on CCDs and advanced image sensors.

I. Inoue et al., "Low dark current pinned photodiode for CMOS image sensor", Proc. 1999 IEEE Workshop; if this is a entire book. only the relevant parts concerning "pinned photodiodes on CCD and AIS".

* cited by examiner

HIGHLY SENSITIVE SOLID-STATE IMAGE SENSOR

This application is a §371 national phase filing of PCT/CH2005/000554 filed Sep. 26, 2005, and claims priority to European application No. 04 405611.7 filed Sep. 29, 2004.

FIELD OF THE INVENTION

The present invention relates to all sensing and measuring techniques that require the position-dependent detection of electromagnetic wave fields, preferably in the ultraviolet, visible or infrared spectral range, with very high sensitivity that approaches the single-photon detection limit. In particular, the present invention relates to all of these sensing and measurement techniques that require dense one- or two-dimensional arrays of pixels, fabricated with industry-standard silicon technologies. A solid-state image sensor and a sensing method according to the preambles of the independent claims are proposed.

BACKGROUND OF THE INVENTION

Figure 1:
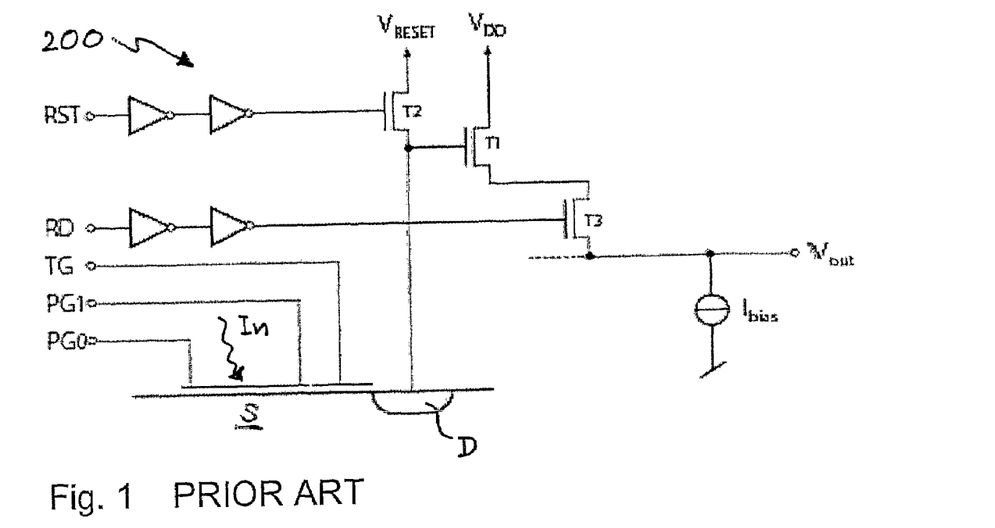
FIG. 1 shows the basic pixel and one signal line of an image sensor according to the prior art.

The traditional construction of a solid-state photo-sensor pixel 200, illustrated in FIG. 1, consists of a semiconductor volume S in which an incident stream of photons In creates a proportional number of photo-charge pairs, a charge-collection mechanism (either diffusion or drift in an electric field caused by a photogate contacted with at least two contacts PG0, PG1), a charge-storage device D (either a conductor-oxide-semiconductor capacitance or a diffusion capacitance), a sensing or source-follower transistor T1, a reset switch T2, a pixel-select switch T3 and an electronic circuit for buffering or amplification of the collected photo-charge signal (realized, e.g., as a source follower, consisting of the source-follower transistor T1 and a current source that provides a bias current $I_{bias}$). This is explained in detail in P. Seitz, "Solid-state Image Sensing", in "Handbook of Computer Vision and Applications", eds. B. Jähne, H. Haussecker and P. Geissler, pp. 165-222, Academic Press, New York, 1999.

The total external quantum efficiency of the detection of visible and near infrared (NIR) irradiation with silicon easily surpasses 50%. Current restrictions in the sensitivity of semiconductor photo sensors are rather due to noise in the electronic photo-charge detection circuits. Three relevant noise sources can be identified as follows:

(i) reset noise, also called kTC noise, originating from the temperature dependent resistor (Johnson) noise in the signal path of the reset circuit;

(ii) 1/f noise in the channel of the first transistor of the electronic photo-charge detection circuit;

(iii) resistor (Johnson) noise in the channel of the first transistor of the electronic photo-charge detection circuit.

From literature, it is known how to process photo-charge signals with the so-called correlated double sampling (CDS) technique, so that the first two noise sources (i), (ii) can be virtually eliminated, see for example A. J. P. Theuwissen, "Solid-state imaging with charge-coupled devices", Kluwer, Dordrecht, 1995. CDS necessitates two measurements per photo-charge measurement: in a first step, the photo-charge detection circuit is reset to a certain, not precisely known voltage due to reset noise, and this voltage is measured. In a second step, the accumulated photo charge is transferred onto the same node of the photo-charge detection circuit, and the resulting voltage value is again measured. The difference of these two results yields the desired photo-charge value that is essentially devoid of the first two noise sources.

The third noise source (iii) turns out to be the key limiting factor for high-sensitivity photo-charge measurements: the input-referred photo-charge noise contribution of the first transistor in the photo-charge detection circuit is proportional to the effective capacitance at the gate of the first transistor, proportional to the square root of the temperature and proportional to the square root of the bandwidth. This relationship has been used in various ways to arrive at the state of the art in high-sensitivity photo sensing.

J. Janesick et al. describe in "Sub-electron noise charge coupled devices", Proc. SPIE, Vol. 1242, pp. 238-251, 1990, how to exploit the square-root dependence of the photo-charge detection noise from the measurement bandwidth. They teach the principle of a charge-coupled device (CCD) with which the same photo-charge packet can be measured non-destructively and hence repeatedly. This so-called Skipper CCD produces a number n of statistically independent measurement values that are subsequently averaged. As predicted by theory, the photo-charge detection noise is reduced with the square root of the number n of averaged measurements, which corresponds to the measurement bandwidth. In this way, a statistical photo-charge detection uncertainty of less than one photoelectron has been obtained in practice. Unfortunately, the whole measurement process takes n times longer, so that the application of the Skipper CCD is essentially restricted to astronomy and a few other scientific fields.

A. Krymski et al. describe in "A 2e⁻ Noise 1.3 Megapixel CMOS Sensor", Proc. 2003 IEEE Workshop on CCDs and advanced image sensors" a method that exploits the parallelism of signal processing in image sensors that are fabricated with complementary-metal-oxide-semiconductor (CMOS) processes. They reduce the bandwidth in the signal path from the individual pixels to the output amplifier, and since this is done for several pixels simultaneously, the measurement process is not prolonged despite the effective bandwidth reduction of the photo-charge detection process. In addition, a CDS method is implemented to effectively cancel reset noise. In this way, a statistical photo-charge detection uncertainty of a few electrons is experimentally obtained at full video bandwidth of several MHz and at room temperature.

U.S. Patent Application Publication No. 2003/0042400A1 (Hynecek, "Compact Image Sensor Layout with Charge Multiplying Register") describes an alternate approach to high-sensitivity photo detection. A physical amplification mechanism, making use of the avalanche charge-multiplication effect, is employed. This does not reduce the noise contribution of the electronic charge-detection process, but since much larger charge signals are present at the input of the charge-detection circuit, the signal-to-noise ratio of the photo-charge measurement process is significantly improved. The observed statistical photo-charge uncertainty is close to one electron, at a full video bandwidth of several MHz and at room temperature.

Since the avalanche effect is implemented using a long series of CCD stages at rather high voltages of up to 20 V, this high-sensitivity photo sensor cannot be fabricated with industry-standard CMOS processes, and it cannot be operated with industry-standard 3.3 V supply voltages.

SUMMARY OF THE INVENTION

A principal object of the invention is to provide a solid-state image sensor for electromagnetic radiation, with a high detection sensitivity that approaches the single-photon detection limit. It is a further object of the invention to allow the fabrication of this high-sensitivity image sensor with industry-standard semiconductor processes. A still further object of the invention is to provide a method for sensing incident electromagnetic radiation with a high detection sensitivity.

These and other objects are solved by the solid-state image sensor and the sensing method as defined in the independent claims. Preferred embodiments of the sensing device and method are defined in the dependent claims.

The present invention overcomes the state of the art in high-sensitivity photo sensing with a fully CMOS-compatible image-sensor architecture that relies on the simultaneous reduction of the bandwidth in all column or row signal lines, to which the individual pixels are connected with their respective column- or row-select switches. As long as a pixel type allows CDS operation, it can be used in the invention without restrictions. According to the invention, the output stages can be analog or digital, again under the requirement that CDS operation is not impaired. In this way, effective statistical noise in the detection of photo-charge packets of a few photoelectrons can be obtained.

The ultimate, physical detection limit of any photo sensor is given by the quantum nature of light, teaching that light consists of individual photons. According to the present invention, a solid-state image sensor with a very high sensitivity approaching this single-photon detection limit is realized with a combination of three modular building blocks:

(a) a pixel with a photosensitive area (photo site), an intermediate photo-charge storage capability as used for correlated double sampling, and an electronic circuit for signal buffering or amplification, preferably a source follower;

(b) a column or row signal line to which a plurality of such pixels is connected using transistor switches, incorporating a low-pass filter and an amplifier, preferably a programmable gain amplifier (PGA); and (c) a readout circuit to which the column or row signal lines are connected, comprising either a plurality of analog-to-digital converters with a digital multiplexer or a plurality of analog amplifiers with an analog multiplexer.

Photo-generated signals are read out and the reset level is subtracted either in the analog or in the digital domain, to implement a CDS method. In this way, two basic techniques are implemented simultaneously for the reduction of the different noise sources: CDS reduces reset (kTC) noise and 1/f noise in the transistor channel, while low-pass filtering reduces white resistor (Johnson) noise in the transistor channel.

Accordingly, the solid-state image sensor according to the invention comprises a plurality of photodetecting elements for generating electric charge carriers as a function of incident electromagnetic radiation. It further comprises a signal line to which two or more of the photodetecting elements are connected and to which a low-pass-filter structure and an amplifier, preferably a programmable-gain amplifier, are assigned. The signal line is connected to a readout circuit.

The method for detecting incident electromagnetic radiation using the image sensor according to the invention comprises the steps of: generating electric charge carriers as a function of incident electromagnetic radiation in a plurality of photodetecting elements, transferring an electric signal characteristic of the generated electric charge on a signal line, and processing the electric signal in a readout circuit. The signal-transfer bandwidth of the signal line is reduced by assigning a low-pass-filter structure and an amplifier, preferably a programmable-gain amplifier, to the signal line. The low-pass-filter structure is preferably built up by exploiting a parasitic capacitance of the signal line.

Preferred embodiments of the image sensor according to the invention contain three elements, (a)-(c) as described above, that may be combined independently. The concept of line-wise low-pass filtering can deliberately use, e.g., metal-insulator-metal capacitances, polysilicon-polysilicon capacitances or just parasitic capacitances between neighboring signal lines, in order to reduce the bandwidth of the signal path.

BRIEF DESCRIPTION OF THE DRAWINGS

Embodiments of the invention and, for better understanding, a image sensor according to the prior art, are described in greater detail hereinafter relative to the attached schematic drawings.

DESCRIPTION OF PREFERRED EMBODIMENTS

Figure 2:
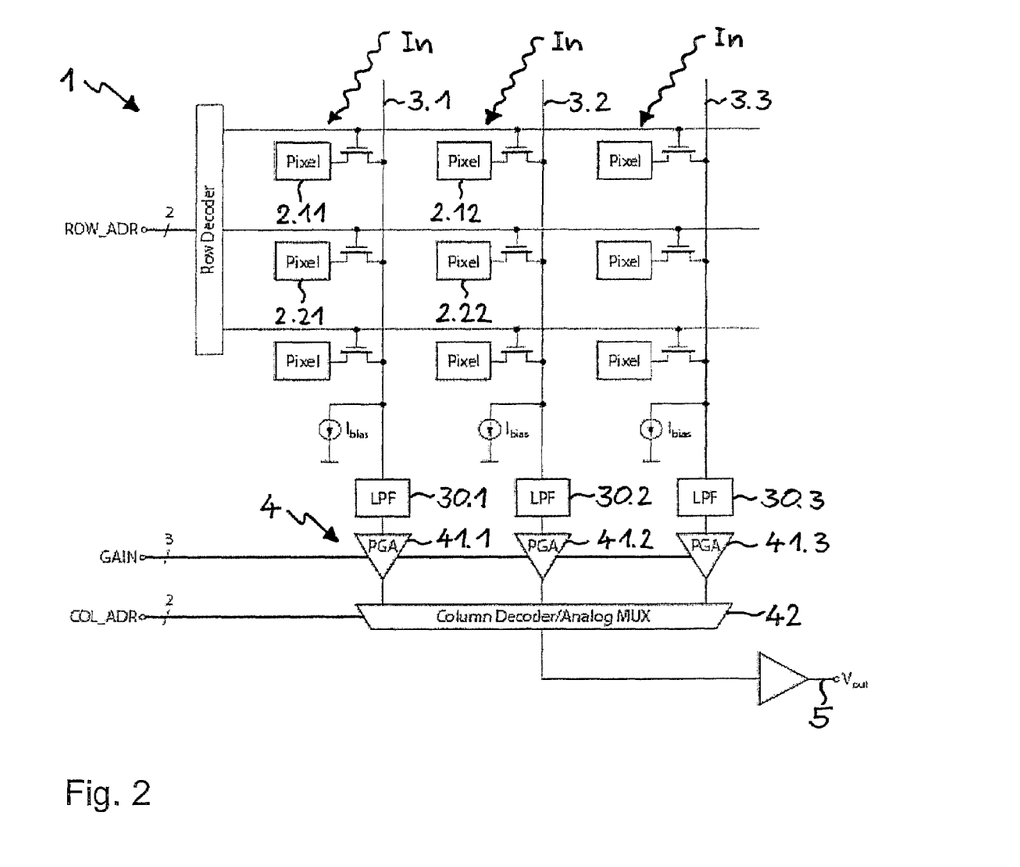
FIG. 2 shows a first embodiment of an image sensor according to the invention.

The high-sensitivity image sensor 1 according to the invention is based on the reduction of photo-charge measurement bandwidth, simultaneously for a large number of photo-charge measurements. This is realized by a construction as illustrated in FIG. 2. A plurality of pixels 2.11, 2.21, ... is connected to a common signal line 3.1, making use of select switches such as field effect transistors. In the example of FIG. 2, the common signal line 3.1 is a column line; alternatively, it could be a row line. A plurality of these signal lines 3.1, 3.2, ... is connected to one or several output circuits 4. Each of the signal lines 3.1, 3.2, ..., has its own, independent low-pass filter 30.1, 30.2, ..., and programmable gain amplifier (PGA) 41.1, 41.2, .... The amplifiers 41.1, 41.2, ..., are all connected to an analog multiplexer 42.

The independent low-pass filters 30.1, 30.2, ..., provide for the simultaneous reduction of signal bandwidth in all signal lines 3.1, 3.2, ..., effectively reducing the statistical noise of the photo-charge detection process without impairing the overall pixel readout speed. In a preferred mode of operation, this requires a bandwidth limitation through the low-pass filter 30.1, 30.2, ..., that corresponds to less than half of the readout time of one signal line 3.1, 3.2, ... (column or row). Since CDS relies on two measurements of a pixel value, the maximum time that is available for low-pass filtering and reading out the two corresponding pixel signals is the time during which the pixels 2.11, 2.21, ..., of one row or one column are connected to the signal line 3.1. According to the invention, the obtainable reduction of photo-charge measurement noise is, therefore, given by the square root of the low-pass filter bandwidth.

The low-pass filtered signals are processed by electronic circuits 41.1, 41.2, ..., in each signal line 3.1, 3.2, ..., that buffer the signals or amplify them with a suitable factor. This factor can be fixed, or it can be programmable. The latter is advantageous when a large dynamic range is desired: when the pixel 2.11, 2.21, ..., is illuminated with very weak optical signals, a large amplification factor is desirable; when an intense optical signal arrives, a small amplification factor is more suitable; the goal is the efficient use of the available voltage swing of the implemented amplifier chain.

Each pixel 2.11, 2.12, ..., must be of a type that allows the implementation of a CDS technique. This implies that two measurements must be possible within a very short time of typically less than a few microseconds: a first measurement is made right after the reset operation of the photo-charge measurement capacitance; a second measurement is carried out after the photo-charge packet has been physically moved to the same measurement capacitance. For this reason, preferential pixel types are photo-gate pixels, as described for example by U.S. Pat. No. 5,841,126 (Fossum, "CMOS active pixel sensor type imaging system on a chip"), pinned photo-diodes, as described for example by I. Inoue et al., "Low dark current pinned photodiode for CMOS image sensor", Proc. 1999 IEEE Workshop on CCD and AIS, or dendritic-gate pixels, as described for instance in European patent application No. 04,405,489.8 (B. Büttgen et al., "Large-area pixel for use in an image sensor").

Figure 5:
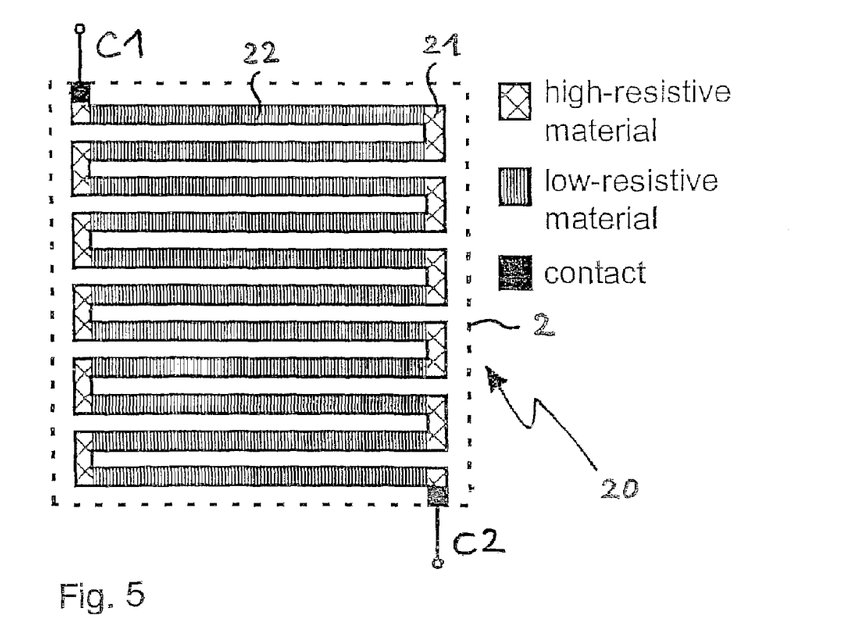
FIG. 5 shows a top view of a dendritic-gate pixel for use in an image sensor according to the invention.

FIG. 5 illustrates a dendritic-gate pixel 2 for use in the image sensor 1 according to the invention. It is suited for detecting incident radiation over a large area with high sensitivity and low power consumption. A snake-like dendritic gate structure 20 is arranged on top of a thin insulating layer covering a semiconductor substrate. The dendritic gate 20 is electrically connected at two contacts C1, C2 with voltage sources, leading to the flow of a current and a position-dependent potential distribution in the gate 20 and in the semiconductor material underneath. The snake-like structure 20 combines high-resistive and low-resistive gate materials 21, 22. The combination of high-resistive material 21 with low-resistive material 22 leads to a controlled uniform potential distribution. Due to the use of dendritic structures and various materials 21, 22, the pixel 2 can be optimized for a certain application, in particular in terms of the electric field distribution, the RC time constant, the power consumption and the spectral sensitivity.

Dendritic-gate pixels 2 as shown in FIG. 5 are a preferred implementation of the opto-electronic transformation circuitry. They allow for a complete charge transfer of the photo-generated charge-carrier pairs by utilizing drift-field charge separation and hence enable the implementation of a CDS readout scheme. Implementation of the first stage in the proposed low-noise read-out scheme for two-dimensional image sensors 1 according to the invention is not limited to the usage of dendritic-gate pixels: any high-sensitivity pixel structure fits into the proposed framework and may be used to the benefit of a very-low-noise image-sensor circuit fabricated in CMOS and other semiconductor technologies.

Each signal line 3.1, 3.2, . . . is connected to one or several output lines 5. The signal lines 3.1, 3.2, . . . are read out sequentially or in parallel, in the analog or in the digital domain. FIG. 2 illustrates a readout in the analog domain; electronic switches in the analog multiplexer 42 connect one signal line 3.1, 3.2., . . . at a time to the output line 5 through its associated buffer-amplifier circuit 41.1, 41.2, . . . . If several output lines 5 and corresponding output buffer amplifier circuits are available, more than one signal line 3.1, 3.2, . . . can be read out at the same time.

Figure 3:
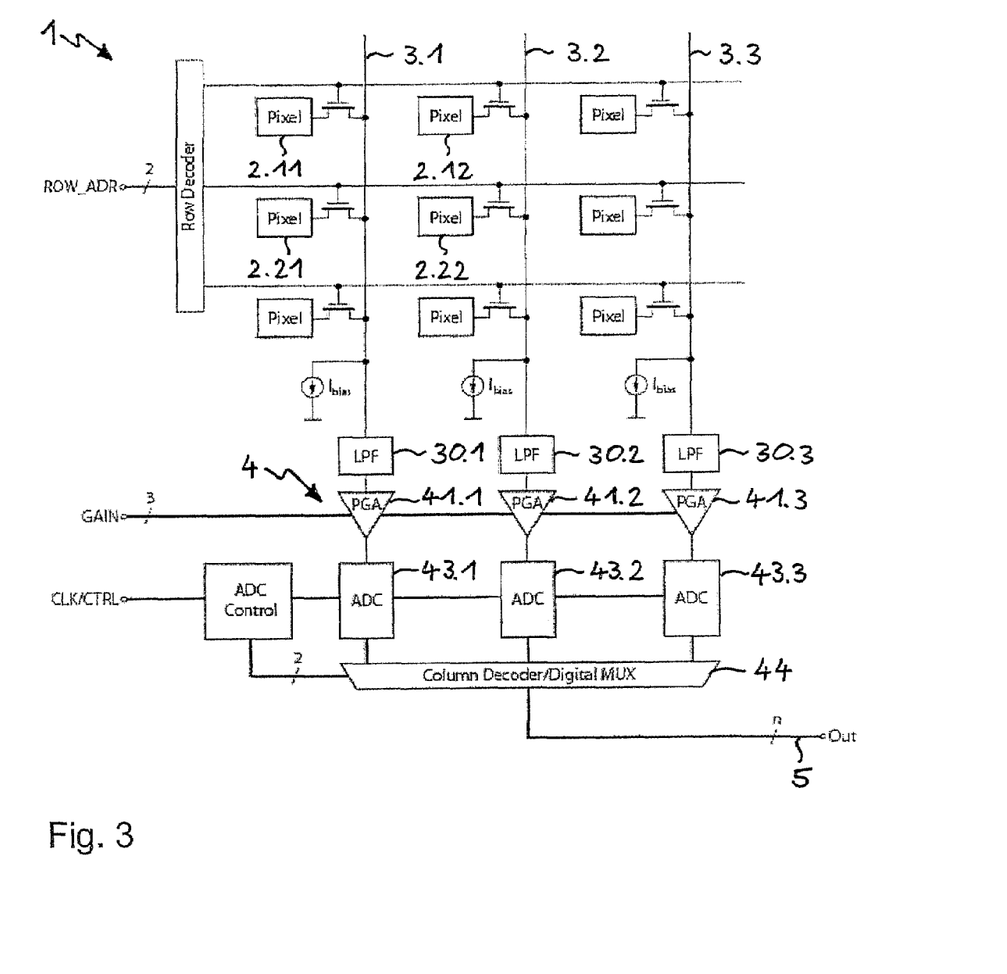
FIG. 3 shows a second embodiment of an image sensor according to the invention.

Alternatively, it is possible to convert the signal-line values directly into digital numbers, by employing a plurality of analog-to-digital converters (ADC). In an extreme but desirable embodiment, shown in FIG. 3, each signal line 3.1, 3.2, . . . has its own ADC 43.1, 43.2, . . . , whose speed matches the bandwidth of the low pass filter 30.1, 30.2, . . . . The analog-to-digital converters 43.1, 43.2, . . . are all connected to a digital multiplexer 44.

Traditional implementations of a low-pass filter (LPF) that limits the bandwidth on the column line of the image-sensor array consist, e.g., in adding lumped capacitances to this column line, utilizing the capacitive load of switched-capacitance circuits or employing simple active LPF structures. In modern sensor implementations using advanced deep-submicron technologies, the pixel size shrinks constantly and hence the overhead created by such additional circuitry to simultaneously limit the bandwidth of the data paths grows at the same time. The reason for this is that poly-poly capacitances or metal-insulator-metal (MIM) capacitances do not increase their surface-dependent capacitance value much. Preferred embodiments according to the present invention try to avoid such limitations by more efficiently utilizing the available silicon area.

Figure 4:
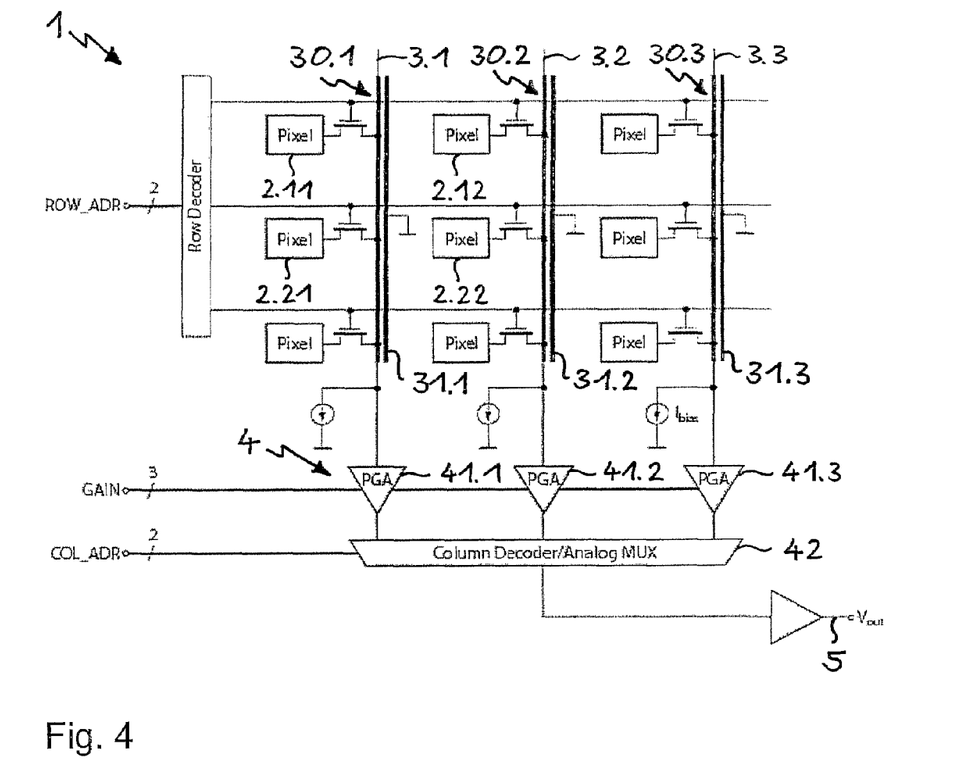
FIG. 4 shows a third embodiment of an image sensor according to the invention.

A particularly preferred embodiment of the image sensor 1 according to the invention is sketched in FIG. 4. In this embodiment, the parasitic capacitance on the column-line data path is deliberately increased by placing a power line 31.1, either the positive or negative supply voltage, in parallel to the signal line 3.1 close to each other over a long length. The parasitic capacitance can be further increased if these line pairs 3.1, 31.1 are laid out as metal-insulator-metal (MIM) capacitance devices in the silicon semiconductor process, i.e., using a very thin oxide between the two parallel signal lines that are stacked on top of each other. In combination with the input impedance of the subsequent amplifier stage the line pairs form the desired low-pass filter circuit. The filtering effect increases linearly with the length of the pixel field, and hence the proposed embodiment according to FIG. 4 is most suitable for large-area-pixel fields with long column lines 3.1, 3.2, . . . .

Preferably, polysilicon-polysilicon capacitances are used for at least part of the signal line 3.1. According to FIG. 4, the polysilicon signal line 3.1 is connected at both ends and may also be tapped in between, in order to establish the electrical connections to the individual pixels 2.11, 2.21, . . . . This configuration explicitly increases the resistance of the column data line 3.1 in order to increase the time constant of the passive RC low-pass filter and thus decrease the dominant pole of the low-pass filter circuit towards lower frequencies.

For the preferred embodiment of FIG. 4, the combination with a column-wise ADC, a common ADC or another ADC topology is an alternate choice which does not interfere with the considerations made before. Although column-wise ADC structures have the advantage of a low frequency data path which supports the arguments of a better noise performance in such cases, single or only a few output channels can be handled with excellent noise performance. This is because gain has been applied to the signals in the low-bandwidth domain and thus additional bandwidth does not reduce the overall performance of the image-sensing device anymore. Nevertheless, careful design has to be applied to the output path if low-noise and high-dynamic-range operation is required simultaneously.

This invention is not limited to the preferred embodiments described above, to which variations and improvements may be made, without departing from the scope of protection of the present patent.

LIST OF REFERENCE SIGNS

1 Image sensor
2 Pixel
20 Dendritic gate
21 High-resistive material
22 Low-resistive material
200 Prior-art pixel
3 Signal line
30 Low-pass filter structure
31 Parallel power line
4 Signal line output circuit
41 Amplifier
42 Analog multiplexer
43 Analog-to-digital converter
44 Digital multiplexer
5 Output line with associated buffer amplifier
C1, C2 Contacts to dendritic gate
D Charge-storage diffusion
$I_{bias}$ Bias current for source follower transistor T1

In Incident radiation
PG0, PG1 Photogate contacts
RD Row-select signal
RST Reset signal
T1 Sensing/source-follower transistor
T2 Reset switch
T3 Pixel-select switch
TG Transfer gate
$V_{DD}$ Supply voltage
$V_{out}$ Output voltage
$V_{RESET}$ Reset voltage

The invention claimed is:

1. A solid-state image sensor comprising:
a plurality of photodetecting elements for generating electric charge carriers as a function of incident electromagnetic radiation,
a signal line to which two or more of the photodetecting elements are connected, and
a readout circuit to which the signal line is connected,
said readout circuit including
a low-pass-filter structure and an amplifier assigned to the signal line, wherein said low-pass filter structure is adapted to reduce statistical noise from photo-charge detection without impairing overall pixel readout speed of said photodetecting elements.

2. The image sensor according to claim 1, wherein said signal line is at least partly laid out as a metal-insulator-metal capacitance device, forming said low-pass-filter structure.

3. The image sensor according to claim 2, wherein
said signal line is at least partly laid out as a polysilicon-polysilicon capacitance device, forming a low-pass-filter structure;
a power line is stacked in parallel to the signal line, forming a low-pass-filter structure;
each photodetecting element includes intermediate photo-charge storage for intermediate storage of the electric charge carriers, to allow correlated double sampling;
each photodetecting element comprises a photogate pixel, a pinned photodiode or a dendritic-gate pixel;
the amplifier is a programmable-gain amplifier;
the readout circuit comprises an analog-to-digital converter assigned to said signal line; and
a plurality of signal lines are connected via an analog or digital multiplexer circuit to at least one output line.

4. A method for detecting incident electromagnetic radiation using the image sensor according to claim 3, comprising the steps of:
generating electric charge carriers as a function of incident electromagnetic radiation in a plurality of photodetecting elements,
transferring an electric signal characteristic of the generated electric charge carriers on a signal line, and
processing the electric signal in a readout circuit, wherein reducing signal-transfer bandwidth of the signal line by assigning a low-pass-filter structure and an amplifier to the signal line, and statistical noise of photo-charge detection is reduced without impairing overall pixel readout speed of said photodetecting elements.

5. The method according to claim 4, wherein said low-pass-filter structure is built up by exploiting a parasitic capacitance.

6. The image sensor according to claim 1, wherein said signal line is at least partly laid out as a polysilicon-polysilicon capacitance device, forming said low-pass-filter structure.

7. The image sensor according to claim 1, wherein a power line is stacked in parallel to said signal line, forming said low-pass-filter structure.

8. The image sensor according to claim 1, wherein each photodetecting element includes an intermediate photo-charge storage for intermediate storage of the electric charge carriers, to allow correlated double sampling.

9. The image sensor according to claim 1, wherein each photodetecting element comprises a photogate pixel, a pinned photodiode or a dendritic-gate pixel.

10. The image sensor according to claim 1, wherein said amplifier is a programmable-gain amplifier.

11. The image sensor according to claim 1, wherein said readout circuit comprises an analog-to-digital converter assigned to said signal line.

12. The image sensor according to claim 1, comprising a plurality of signal lines) which are connected via an analog or digital multiplexer circuit to at least one output line.

13. A method for detecting incident electromagnetic radiation using the image sensor according to claim 1, comprising the steps of:
generating electric charge carriers as a function of the incident electromagnetic radiation in said plurality of photodetecting elements,
transferring an electric signal characteristic of the generated electric charge carriers on a signal line,
processing the electric signal in a readout circuit, wherein reducing signal-transfer bandwidth of the signal line by assigning a low-pass-filter structure and an amplifier to the signal line and statistical noise of photo-charge detection is reduced without impairing overall pixel readout speed of said photodetecting elements.

14. The method according to claim 13, wherein said low-pass-filter structure is built up by exploiting a parasitic capacitance.

15. The solid-state imaging device of claim 1, wherein said low-pass-filter structure has a bandwidth limitation corresponding to less than half of a readout time of said signal line.

16. The solid-state imaging device of claim 1, the low-pass-filter structure having a bandwidth, wherein the statistical noise reduction is equal to the square root of the bandwidth of said low-pass-filter structure, to allow correlated double sampling.

17. The solid-state imaging device of claim 1, wherein said low-pass-filter structure is adapted to reduce white resistor or Johnson noise.

18. A solid-state imaging sensor comprising:
a plurality of photodetecting elements for generating electric charge carriers as a function of incident electromagnetic radiation,
a signal line to which two or more of the photodetecting elements are connected, and
a readout circuit to which the signal line is connected, said readout circuit including an amplifier and a power line that is stacked in parallel to said signal line to form a low-pass-filter structure, which are assigned to the signal line.

* * * * *

UNITED STATES PATENT AND TRADEMARK OFFICE
CERTIFICATE OF CORRECTION

PATENT NO. : 7,550,705 B2  Page 1 of 1
APPLICATION NO. : 11/663412
DATED : June 23, 2009
INVENTOR(S) : Peter Seitz et al.

It is certified that error appears in the above-identified patent and that said Letters Patent is hereby corrected as shown below:

Column 8, line 21, claim 12, "lines)" should read --lines--.

Signed and Sealed this

Twenty-second Day of December, 2009

David J. Kappos
*Director of the United States Patent and Trademark Office*